(12) United States Patent
Ochi et al.

(10) Patent No.: US 7,528,533 B2
(45) Date of Patent: May 5, 2009

(54) VIBRATORY GYROSCOPE

(75) Inventors: Atsushi Ochi, Tokyo (JP); Takeshi Inoue, Tokyo (JP); Mitsuru Yamamoto, Tokyo (JP); Kenji Kuramoto, Tokyo (JP); Mitsuhiro Nakajima, Tokyo (JP); Takeshi Hosokawa, Tokyo (JP); Hiroyuki Takahashi, Tokyo (JP); Takashi Nakahara, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 0 days.

(21) Appl. No.: 11/795,188

(22) PCT Filed: Jan. 11, 2006

(86) PCT No.: PCT/JP2006/300564

§ 371 (c)(1),
(2), (4) Date: Sep. 6, 2007

(87) PCT Pub. No.: WO2006/075764

PCT Pub. Date: Jul. 20, 2006

(65) Prior Publication Data

US 2008/0111451 A1      May 15, 2008

(30) Foreign Application Priority Data

Jan. 13, 2005    (JP) ............................. 2005-006581

(51) Int. Cl.
*H03H 9/21*    (2006.01)
(52) U.S. Cl. ..................... 310/370; 73/504.02; 331/156
(58) Field of Classification Search ................. 310/370; 73/504.02; 331/156
See application file for complete search history.

(56) References Cited

U.S. PATENT DOCUMENTS

| 6,490,925 B2 * | 12/2002 | Inoue et al. ............... 73/504.16 |
| 7,216,540 B2 * | 5/2007 | Inoue et al. ............... 73/504.16 |

FOREIGN PATENT DOCUMENTS

| JP | 10-19576 A | 1/1998 |
| JP | 11014373 | 1/1999 |
| JP | 2000-321076 A | 11/2000 |
| JP | 2004-361320 A | 12/2004 |
| WO | WO 20040/079296 | 9/2004 |

OTHER PUBLICATIONS

International Search Report.

* cited by examiner

*Primary Examiner*—Quyen P Leung
*Assistant Examiner*—Bryan P Gordon
(74) *Attorney, Agent, or Firm*—Collard & Roe, P.C.

(57) ABSTRACT

A vibratory gyroscope including a vibrator (10) integrally having a plate-like body portion (11) spreading along a reference plane, three drive arms (12, 13, 14) extending in a first direction from the body portion along the reference plane, and two detection arms (15, 16) extending in a second direction opposite to the first direction from the body portion along the reference plane. The three drive arms are composed of two exciting drive arms (12, 13) that are excited in mutually opposite phases in the reference plane and a non-exciting drive arm (14) located between the two exciting drive arms. Each of the three drive arms has an arm width in a width direction along the reference plane and perpendicular to the first direction. Each of the two detection arms has an arm width greater than that of the drive arm in the width direction, thereby suppressing generation of vibrations along the reference plane.

9 Claims, 6 Drawing Sheets

VIBRATORY GYROSCOPE

CROSS REFERENCE TO RELATED APPLICATIONS

Applicants claims priority under 35 U.S.C. §119 of Japanese Application No. 2005-006581 filed Jan. 13, 2005. Applicants also claims priority under 35 U.S.C. §365 of PCT/JP2006/300564 filed Jan. 11, 2006. The international application under PCT article 21(2) was not published in English.

TECHNICAL FIELD

This invention relates to a vibratory gyroscope comprising a vibrator having three drive arms and two detection arms extending in mutually opposite directions from a plate-like body portion.

BACKGROUND ART

Generally, vibratory gyroscopes are known as devices for measuring the angular velocity of a rotating object using the fact that a Coriolis force perpendicular to vibration and an angular velocity vector of the rotating object acts on an object vibrating on the rotating object, and have been used as devices for position confirmation in airplanes, large ships, space satellites, and so on. Recently, in the field of consumer products, vibratory gyroscopes are used for position measurement in car navigation, car posture control, detection of VTR-camera or still-camera hand movement, and so on.

There have conventionally been known vibratory gyroscopes of various structures comprising a vibrator having a body portion and a pair of drive arms and a pair of detection arms connected to the body portion, wherein both pairs extend in mutually opposite directions in the same plane from the body portion. The vibrators are mainly manufactured by anisotropic etching of Z-cut quartz.

As a conventional vibratory gyroscope, there is one disclosed, for example, in Japanese Unexamined Patent Application Publication (JP-A) No. H11-14373 (Document 1).

Figure 1:
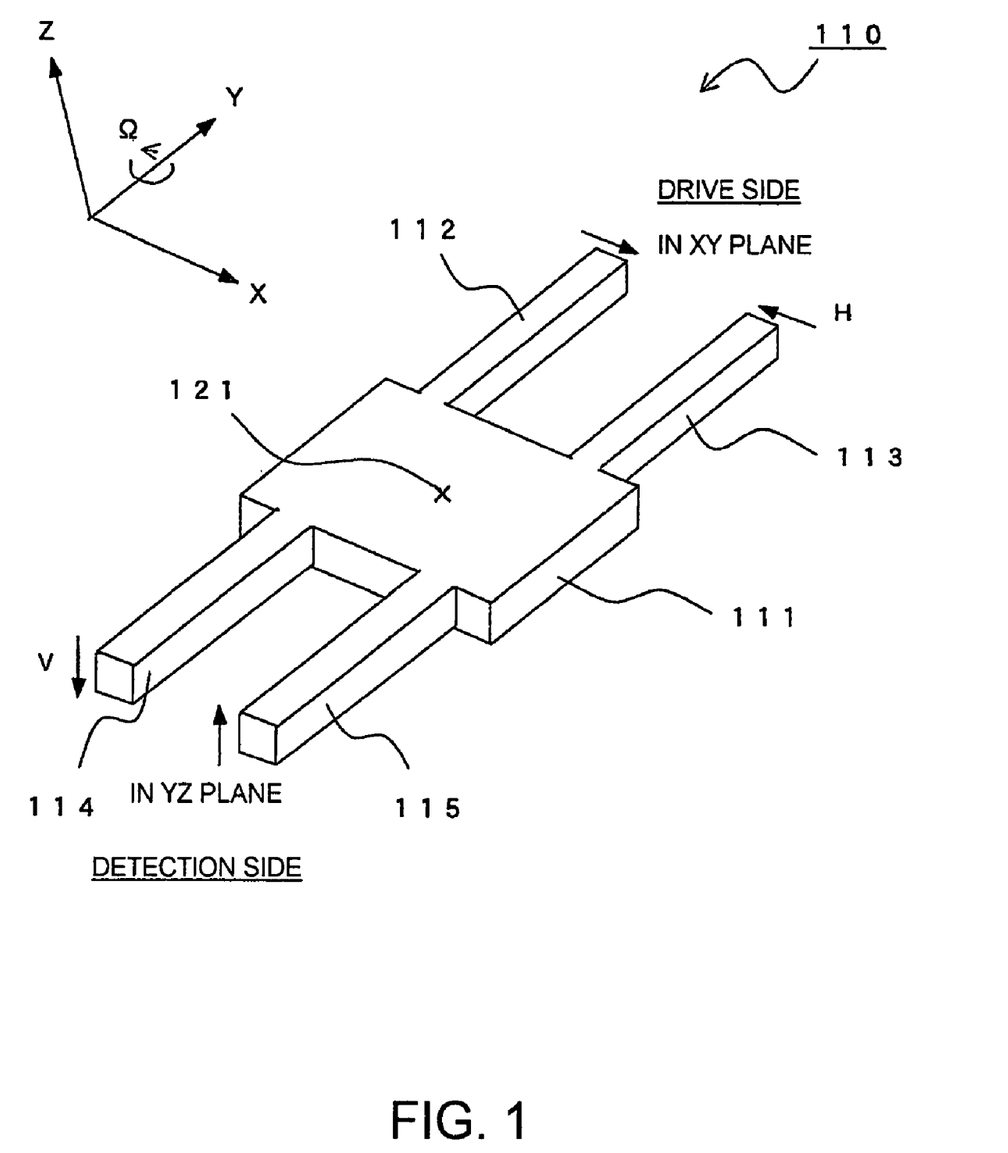
FIG. 1 is a perspective view for explaining a vibrator used in a conventional vibratory gyroscope.

FIG. 1 is a basic structural diagram showing one example of a vibrator for use in a vibratory gyroscope. Technical explanation thereof is given in detail in the prior art of Document 1. An illustrated vibrator 110 comprises a rectangular flat plate body portion 111, a pair of mutually parallel drive arms 112 and 113 connected to the drive side of the body portion 111, and a pair of mutually parallel detection arms 114 and 115 connected to the detection side of the body portion 111. The vibrator 110 is formed into a flat plate shape in the XY plane and has a thickness in the Z-direction. Further, the vibrator 110 has a symmetrical axis which is a central axis thereof along its longitudinal direction.

The drive arms 112 and 113 are driven by non-illustrated drive means so as to cause vibrations in mutually opposite phases in the XY plane. The vibrations in the XY plane are not transmitted to the detection arms 114 and 115 through the body portion 111. In this state, if a rotational angular velocity $\Omega$ is exerted about the symmetrical axis of the vibrator 110, Coriolis forces act on the drive arms 112 and 113. Because of the drive arms 112 and 113 being vibrating, vibrations in mutually opposite phases in the YZ plane are induced to the drive arms 112 and 113. Since the shape is determined so that the drive arms 112 and 113 and the detection arms 114 and 115 resonate together in the YZ plane, the vibrations of the drive arms 112 and 113 in the YZ plane caused by the Coriolis forces are induced to the detection arms 114 and 115. The induced vibrations are detected by non-illustrated detection means provided at the detection arms 114 and 115 and are used for measuring the rotational angular velocity.

Normally, for resonance, the length dimension of each drive arm 112, 113 provided in one direction of the body portion 111 is designed to be equal to that of each detection arm 114, 115. However, for achieving the weight balance by matching a geometric center position 121 of the body portion with a position of the center of gravity of the entire vibrator 110 in order to stabilize the vibrations, the width dimension of each drive arm 112, 113 and that of each detection arm 114, 115 should be set equal to each other. In this state, the symmetrical drive mode of the drive arms 112 and 113 in the XY plane indicated by arrows H in the figure is most susceptible to propagate to the detection arms 114 and 115. This is because resonant frequencies of the respective drive arms 112 and 113 and detection arms 114 and 115 in the direction in the XY plane become equal to each other.

However, with such a configuration, vibrations that would otherwise be produced by the detection arms 114 and 115 in the direction in the YZ plane perpendicular to the XY plane indicated by arrows V in the figure are significantly impeded due to such a resonant frequency. Accordingly, there is a drawback of causing a reduction in S/N ratio and gyro resolution.

As a measure of improving this, Document 1 discloses a plurality of vibratory gyroscopes. One of those vibratory gyroscopes comprises a vibrator having three drive arms and two detection arms. This will be described with reference to FIG. 2.

Figure 2:
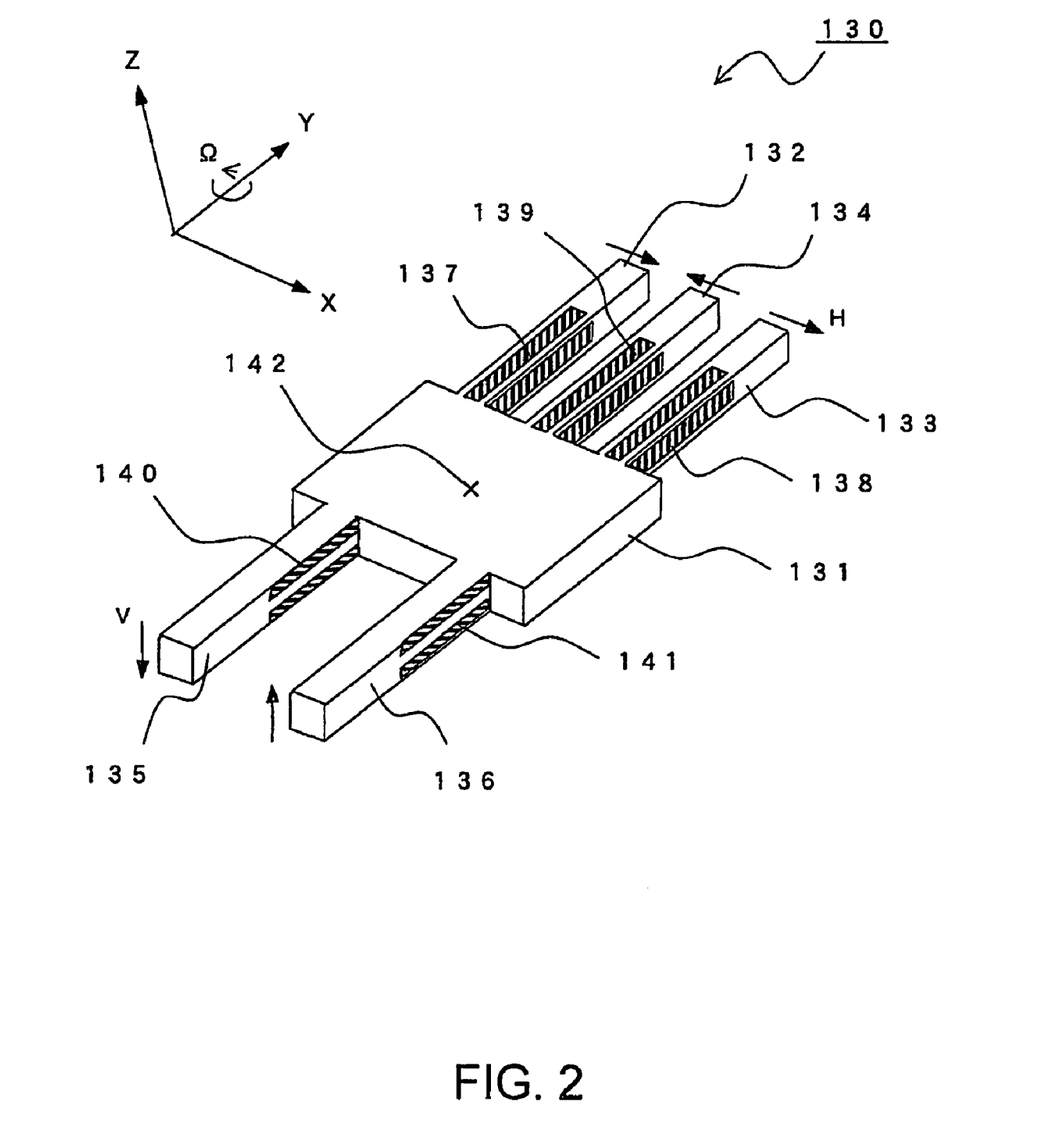
FIG. 2 is a perspective view for explaining another vibrator used in a conventional vibratory gyroscope.

As illustrated, three drive arms 132, 133, and 134 extending on one side of a rectangular flat plate body portion 131 are arms for vibration excitation in the XY plane that are all excited by non-illustrated drive means through electrodes 137, 138, and 139. Phases of vibrations of the adjacent drive arms are opposite to each other. In this case, an angular velocity $\Omega$ is exerted about a longitudinal axis of this vibrator 130, so that the adjacent drive-side arms receive mutually oppositely directed Coriolis forces in the direction perpendicular to the XY plane. The Coriolis forces are transmitted to detection arms 135 and 136 through the body portion 131 and detected by non-illustrated detection means connected to electrodes 140 and 141, so as to be used for measuring the rotational angular velocity.

However, there is a drawback that since the Coriolis force applied to the middle drive arm 134 is in the opposite direction as compared with those applied to the drive arms 132 and 133 at both ends, the Coriolis forces transmitted to the detection arms 135 and 136 through the body portion 131 are largely reduced and thus the gyro sensitivity is deteriorated. That is, as a result of making such a configuration on an experimental basis and evaluating it, it was only possible to obtain a low-sensitivity piezoelectric gyroscope.

DISCLOSURE OF THE INVENTION

Problem to be Solved by the Invention:

A problem to be solved is that when, for example, the shape of the vibrator is point-symmetrical with respect to the geometric center on both the front and side of the vibrator, a reduction in S/N ratio and gyro resolution is caused. That is, the problem is that the resonant frequencies of the respective drive arms and detection arms in the direction in the plane become equal to each other and this resonant frequency affects and significantly impedes vibrations that would otherwise be produced by the detection arms in the direction perpendicular to the plane.

Further, since the mutually adjacent drive arms in the three drive arms are vibrating in mutually opposite phases in the plane, Coriolis forces generated on the drive arms when subjected to an angular velocity are also in mutually opposite phases between the adjacent drive arms. Therefore, there is a drawback that in-phase vibrations perpendicular to the plane generated with the drive arms significantly impede vibration displacement of the detection arms serving to indirectly detect the Coriolis forces, thereby causing a reduction in gyro sensitivity.

It is therefore an exemplary object of this invention to solve the foregoing problems and to provide a high-sensitivity and high-resolution vibratory gyroscope.

Means for Solving the Problem:

According to an exemplary aspect of this invention, there is provided a vibratory gyroscope comprising a vibrator integrally having a plate-like body portion spreading along a reference plane, three drive arms extending in a first direction from the body portion along the reference plane, and two detection arms extending in a second direction opposite to the first direction from the body portion along the reference plane, the vibratory gyroscope characterized in that the three drive arms comprise two exciting drive arms that are excited in mutually opposite phases in the reference plane and a non-exciting drive arm located between the two exciting drive arms, each of the three drive arms has an arm width in a width direction along the reference plane and perpendicular to the first direction, and each of the two detection arms has an arm width greater than the arm width of the drive arm in the width direction, thereby suppressing generation of vibrations of the detection arms along the reference plane.

It may be configured that the two detection arms vibrate in mutually opposite phases in a thickness direction perpendicular to the reference plane when Coriolis forces act on the vibrator.

It may be configured that the body portion is constant in thickness and rectangular in shape, the non-exciting drive arm is located at the same distance from the two exciting drive arms, and the vibrator is symmetrical in shape with respect to a center line of the non-exciting drive arm in the width direction. This configuration is advantageous in terms of manufacture and ensuring stable operation.

It may be configured that center lines of the two detection arms in the width direction coincide with center lines of the two exciting drive arms in the width direction, respectively.

It may be configured that the two detection arms have a detection arm space defined by center lines thereof in the width direction, the two exciting drive arms have an exciting drive arm space defined by center lines thereof in the width direction, and the detection arm space is smaller than the exciting drive arm space and greater than the half of the exciting drive arm space. This configuration is advantageous in terms of efficiently transmitting generated Coriolis forces.

It may be configured that a support post for supporting the vibrator is further included, the three drive arms and the two detection arms have sizes to match a position of the center of gravity of the vibrator with a geometric center position of the body portion, and the support post supports a portion of the vibrator corresponding to the position of the center of gravity. This configuration is advantageous in terms of balancing the vibrator to achieve stable vibrations.

The vibrator may be made of a piezoelectric material.

The piezoelectric material may be a piezoelectric single crystal including at least one of quartz, langasite, potassium niobate, lithium tantalate, and lithium niobate.

The piezoelectric material may be a piezoelectric polycrystal including lead titanium zirconium oxide.

Effect of the Invention:

According to the vibratory gyroscope of the foregoing aspect of this invention, occurrence of resonance of the drive arms and the detection arms can be suppressed and, further, spurious resonance of unwanted components generated by vibrations of the drive arms in the reference plane can be shifted to the outside of a use frequency band. As a result, generation of vibrations of the detection arms along the reference plane is suppressed. Therefore, the high-sensitivity and high-resolution vibratory gyroscope can be provided.

BEST MODE FOR CARRYING OUT THE INVENTION

Referring to the drawings, various exemplary embodiments of this invention will be described. With respect to well-known conditions not directly related to this invention, explanation thereof is omitted.

EXEMPLARY EMBODIMENT 1

Figure 3:
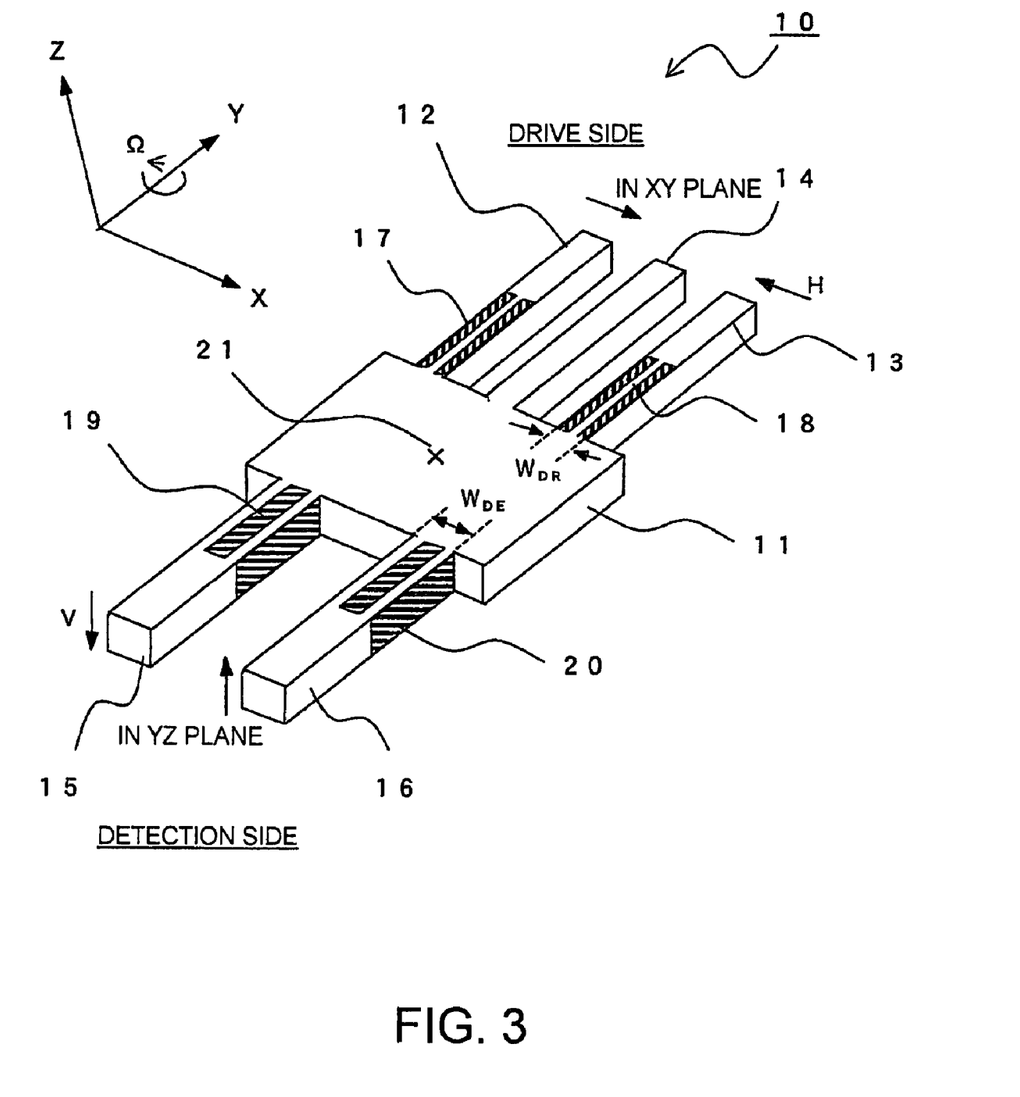
FIG. 3 is a perspective view for explaining a vibrator for use in a vibratory gyroscope according to exemplary embodiment 1 of this invention.

Referring to FIG. 3, a description will be given of a vibratory gyroscope according to exemplary embodiment 1 of this invention.

The vibratory gyroscope shown in FIG. 3 includes a piezoelectric vibrator 10 integrally formed by machining an X-cut langasite wafer. The vibrator 10 is formed from a single flat plate spreading along a reference plane or a principal plane in the form of the XY plane and having a thickness in a thickness direction perpendicular to the principal plane, i.e. in the Z-direction, and has a rectangular body portion 11 at its central portion. The body portion 11 has a geometric center position 21.

The vibrator 10 further comprises drive arms 12, 13, and 14 and detection arms 15 and 16 extending in mutually opposite directions in the principal plane from the body portion 11. That is, the drive arms 12, 13, and 14 extend parallel to each other in the Y-direction, i.e. a first direction, in the principal plane and the detection arms 15 and 16 extend parallel to each other in a second direction opposite to the first direction. Herein, this piezoelectric vibrator 10 is called a five-legged type vibrator. The vibrator 10 has an axisymmetric shape with respect to a central axis extending in the arm extending direction, i.e. the Y-direction.

The drive arms 12 and 13 respectively have well-known drive electrodes 17 and 18 adapted for generating in-plane vibrations and are driven by excitation in mutually opposite phases in the principal plane in the X-direction, i.e. the width direction, in the XY plane indicated by arrows H in the figure. Hereinbelow, the drive arms 12 and 13 will be called exciting drive arms.

The drive arm 14 is located at a middle portion between the drive arms 12 and 13 and is a vibratable arm for non-excitation with no electrode metallization. Hereinbelow, the drive arm 14 will be called a non-exciting drive arm. The exciting drive arms 12 and 13 have the same arm width $W_{DR}$ in the X-direction. On the other hand, the width of the non-exciting drive arm 14 in the X-direction may be equal to or different from that of the exciting drive arm 12, 13.

In the vibrator 10, when excited, the exciting drive arms 12 and 13 cause vibrations in the principal plane. These in-plane vibrations are absorbed by the body portion 11 having rigidity and thus are not transmitted to the detection arms 15 and 16.

When an angular velocity Ω is applied about the central axis extending in the Y-direction, Coriolis forces are generated on the exciting drive arms 12 and 13 in mutually opposite directions along the Z-direction. The Coriolis forces are transmitted to the detection arms 15 and 16 through the body portion 11. That is, the Coriolis forces act on the vibrator 10.

The detection arms 15 and 16 each have an arm width $W_{DE}$ greater than the arm width $W_{DR}$ of the exciting drive arm 12, 13. When the Coriolis forces act on the vibrator 10, the detection arms 15 and 16 cause vibrations in the Z-direction in the YZ plane as indicated by arrows V in the figure, i.e. plane-perpendicular vibrations.

The detection arms 15 and 16 respectively have detection electrodes 19 and 20 adapted for detecting the plane-perpendicular vibrations. Accordingly, the foregoing angular velocity Ω can be detected by non-illustrated detection means connected to the detection electrodes 19 and 20.

As described above, the arm width $W_{DE}$ of the detection arm 15, 16 is set greater than the arm width $W_{DR}$ of the exciting drive arm 12, 13. Therefore, when the drive mode resonant frequency of the vibrator 10 is 7823 Hz, the in-plane vibration spurious resonant frequency can be shifted to 10000 Hz or more by properly setting a difference between the arm widths $W_{DE}$ and $W_{DR}$.

Further, since the non-exciting drive arm 14 is provided in the middle of the drive portion, the weight balance is achieved with respect to the detection arms 15 and 16. Therefore, the center of gravity of the vibrator 10 can be easily matched with the geometric center position 21 of the body portion 11.

Further, since the width of each of the detection arms 15 and 16 can be set greater than the thickness thereof, it is possible to suppress generation of vibrations of the detection arms 15 and 16 in the direction parallel to the principal plane in response to vibrations of the drive arms 12, 13, and 14 in the principal plane. Further, since the thickness is small, the detection arms 15 and 16 are capable of sensitively receiving Coriolis forces in the direction perpendicular to the principal plane.

Figure 4:
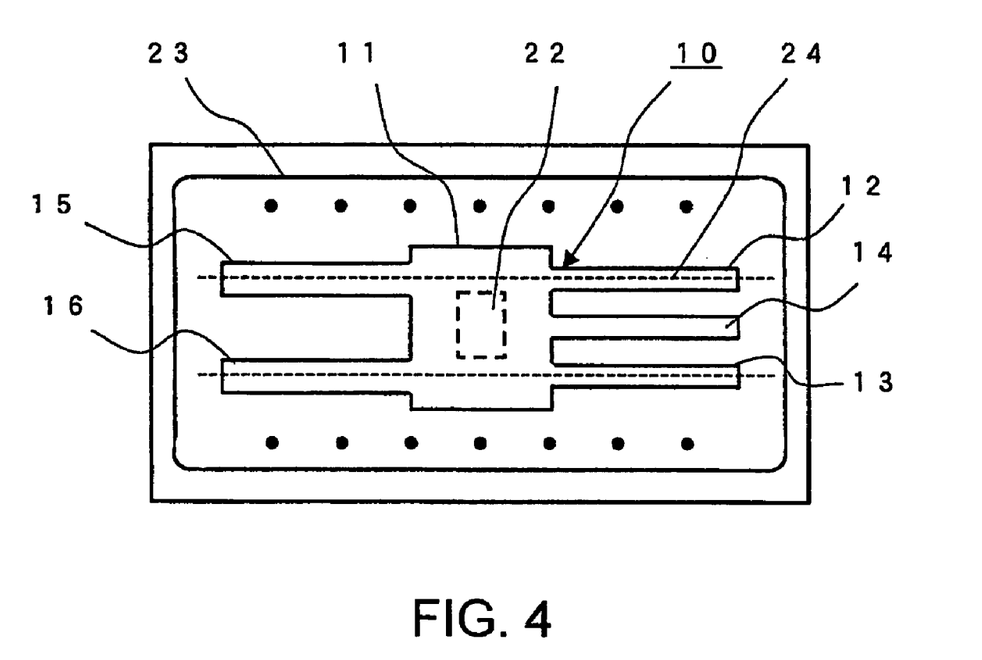
FIG. 4 is a plan view for explaining a vibratory gyroscope using the vibrator of FIG. 3.
Figure 5:
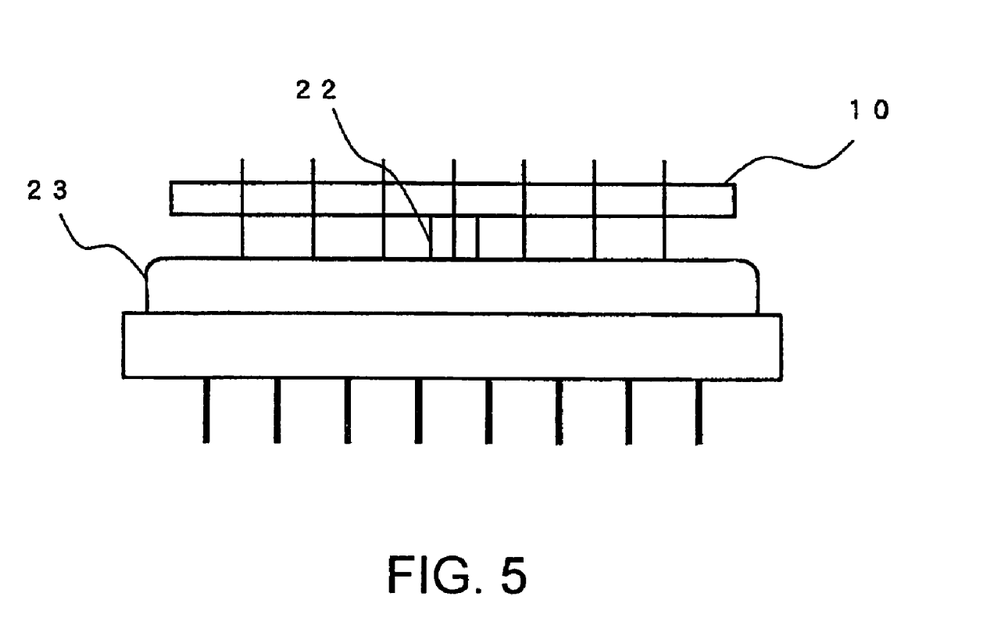
FIG. 5 is a front view for explaining the vibratory gyroscope of FIG. 4.

Referring to FIGS. 4 and 5, a description will be given of a vibratory gyroscope using the foregoing piezoelectric vibrator 10.

The vibrator 10 is fixed, using a support post 22, to a board 23 mounted in a case made of an alloy such as, for example, Kovar. Specifically, the vibrator 10 is supported by the support post 22 at its portion corresponding to the foregoing geometric center position 21. This makes it possible to stably hold the vibrator 10 while vibrating.

Herein, as shown in FIGS. 4 and 5, center lines 24 of the respective detection arms 15 and 16 extending in the longitudinal direction thereof coincide with center lines of the respective exciting drive arms 12 and 13 extending in the longitudinal direction thereof, respectively, thereby providing the highest sensitivity for receiving Coriolis forces.

When the detuning width, i.e. the difference between a driving frequency and a detection frequency, was set to 52 Hz in the piezoelectric vibrator 10 thus configured using langasite, there was obtained a vibratory gyroscope with an extremely high accuracy of a gyro sensitivity being 2.8 mV/ (°/s) and an angular velocity resolution being 0.01°/s (0.01 degrees per second) or less.

EXEMPLARY EMBODIMENT 2

Figure 6:
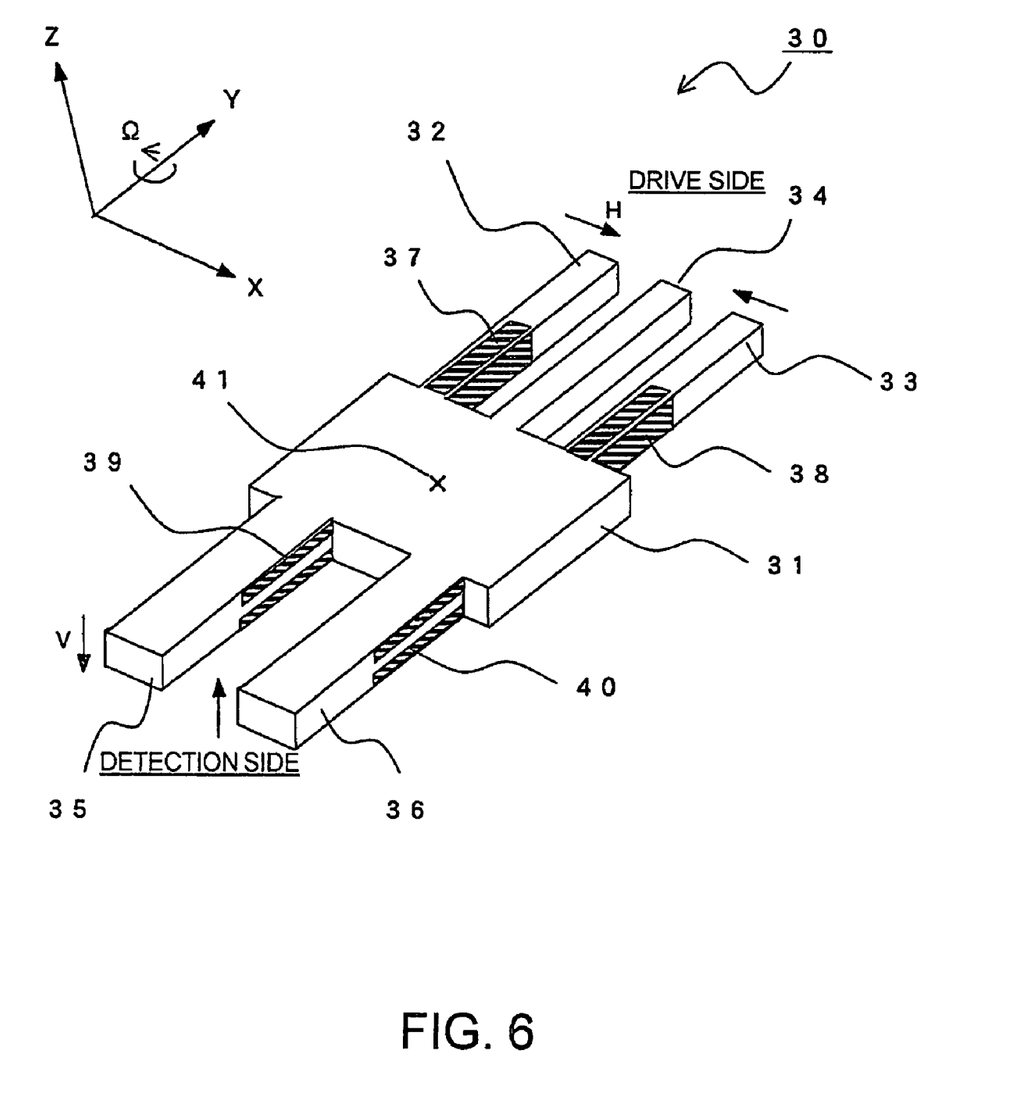
FIG. 6 is a perspective view for explaining a vibrator for use in a vibratory gyroscope according to exemplary embodiment 2 of this invention.

Referring to FIG. 6, a description will be given of a vibratory gyroscope according to exemplary embodiment 2 of this invention.

The vibratory gyroscope shown in FIG. 6 includes a piezoelectric vibrator 30 formed by applying anisotropic etching to a Z-cut quartz wafer. The vibrator 30 is formed from a single flat plate spreading along a reference plane or a principal plane in the form of the XY plane and having a thickness in a thickness direction perpendicular to the principal plane, i.e. in the Z-direction, and has a rectangular body portion 31 at its central portion. The body portion 31 has a geometric center position 21.

The vibrator 30 further comprises drive arms 32, 33, and 34 and detection arms 35 and 36 extending in mutually opposite directions in the principal plane from the body portion 31. That is, the drive arms 32, 33, and 34 extend parallel to each other in the Y-direction, i.e. a first direction, in the principal plane and the detection arms 35 and 36 extend parallel to each other in a second direction opposite to the first direction. Herein, this piezoelectric vibrator 30 is called a five-legged type vibrator. The vibrator 30 has an axisymmetric shape with respect to a central axis extending in the arm extending direction, i.e. the Y-direction.

The drive arms 32 and 33 respectively have well-known drive electrodes 37 and 38 adapted for generating in-plane vibrations and are driven by excitation in mutually opposite phases in the principal plane in the X-direction, i.e. the width direction, in the XY plane indicated by arrows H in the figure. Hereinbelow, the drive arms 32 and 33 will be called exciting drive arms.

The drive arm 34 is located at a middle portion between the drive arms 32 and 33 and is a vibratable arm for non-excitation with no electrode metallization. Hereinbelow, the drive arm 34 will be called a non-exciting drive arm. The exciting drive arms 32 and 33 have the same arm width in the X-direction. On the other hand, the width of the non-exciting drive arm 34 in the X-direction may be equal to or different from that of the exciting drive arm 32, 33.

In the vibrator 30, when excited, the exciting drive arms 32 and 33 cause vibrations in the principal plane. These in-plane vibrations are absorbed by the body portion 31 having rigidity and thus are not transmitted to the detection arms 35 and 36.

When an angular velocity Ω is applied about the central axis extending in the Y-direction, Coriolis forces are generated on the exciting drive arms 32 and 33 in mutually opposite directions along the Z-direction. The Coriolis forces are transmitted to the detection arms 35 and 36 through the body portion 31. That is, the Coriolis forces act on the vibrator 30.

The detection arms 35 and 36 each have an arm width greater than the arm width of the exciting drive arm 32, 33. When the Coriolis forces act on the vibrator 30, the detection arms 35 and 36 cause vibrations in the Z-direction in the YZ plane as indicated by arrows V in the figure, i.e. plane-perpendicular vibrations.

The detection arms 35 and 36 respectively have detection electrodes 39 and 40 adapted for detecting the plane-perpendicular vibrations. Accordingly, the foregoing angular velocity can be detected by non-illustrated detection means connected to the detection electrodes 39 and 40.

As described above, the arm width $W_{DE}$ of the detection arm 35, 36 is set greater than the arm width of the exciting drive arm 32, 33. Therefore, when the drive mode resonant frequency of the vibrator 30 is 9448 Hz, the in-plane vibration spurious resonant frequency can be shifted to 12000 Hz or more by properly setting a difference between these arm widths.

Further, since the non-exciting drive arm 34 is provided in the middle of the drive portion, the weight balance is achieved with respect to the detection arms 35 and 36. Therefore, the center of gravity of the vibrator 30 can be easily matched with the geometric center position 41 of the body portion 31. By fixedly supporting the vibrator 30 with a support post 42 at its portion including the geometric center portion 41 to be the center of gravity, it is possible to stably support the vibrator 30 while vibrating.

When the detuning width, i.e. the difference between a driving frequency and a detection frequency, was set to 38 Hz in the vibrator 30 in the form of the Z-cut quartz element thus configured, there was obtained a piezoelectric vibratory gyroscope with an extremely high accuracy of a gyro sensitivity being 4.2 mV/(°/s) and an angular velocity resolution being 0.01°/s (0.01 degrees per second) or less.

Since the width of each of the detection arms 35 and 36 can be set greater than the thickness thereof, it is possible to suppress generation of vibrations of the detection arms 35 and 36 in the direction parallel to the principal plane in response to vibrations of the drive arms 32, 33, and 34 in the principal plane. Further, since the thickness is small, the detection arms 35 and 36 are capable of sensitively receiving Coriolis forces in the direction perpendicular to the principal plane.

Further, also in this vibrator 30, center lines of the respective exciting drive arms 32 and 33 extending in the longitudinal direction thereof and center lines of the respective detection arms 35 and 36 extending in the longitudinal direction thereof coincide with each other, respectively, thereby providing the highest sensitivity for receiving Coriolis forces.

EXEMPLARY EMBODIMENT 3

Figure 7:
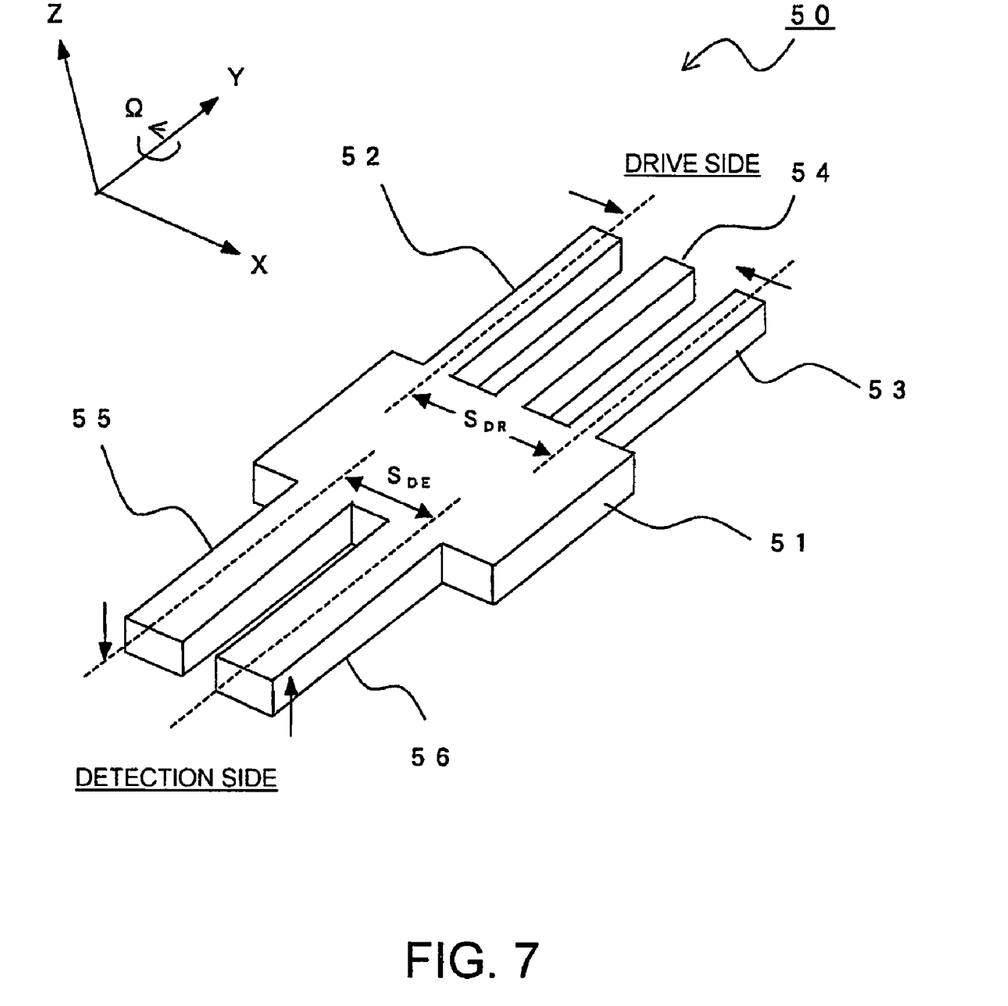
FIG. 7 is a perspective view for explaining a vibrator for use in a vibratory gyroscope according to exemplary embodiment 3 of this invention.

Referring to FIG. 7, a description will be given of a vibratory gyroscope according to exemplary embodiment 3 of this invention.

The structure of a vibrator 50 for use in a vibratory gyroscope shown in FIG. 7 is similar to that of the vibrator 10 or 30 shown in FIG. 3 or FIG. 6. In the vibrator 50, only a body portion 51, drive arms 52, 53, and 54, and detection arms 55 and 56 are illustrated, while electrodes for driving and detection are omitted.

What differs from the vibrator 10 or 30 shown in FIG. 3 or FIG. 6 lies in that a space between width-direction center lines of the exciting drive arms 52 and 53 on the drive side, i.e. an exciting drive arm space $S_{DR}$, is set greater than a space between width-direction center lines of the detection arms 55 and 56, i.e. a detection arm space $S_{DE}$.

As the typical sizes, the body portion 51 has a width of 4 mm and a length of 5 mm, the exciting drive arms 52 and 53 each have a width of 0.4 mm and a length of 6 mm, and the detection arms 55 and 56 each have a width of 0.7 mm and a length of 6 mm. Further, the space between the width-direction center lines of the exciting drive arms 52 and 53 was set to 2.6 mm and the space between the width-direction center lines of the detection arms 55 and 56 was variably set, thereby measuring the gyro characteristics. As a result, when the space between the width-direction center lines of the detection arms 55 and 56 was 1.7 mm, i.e. when the space between the width-direction center lines of the exciting drive arms 52 and 53 was set to approximately 1.5 times the space between the width-direction center lines of the detection arms 55 and 56, it was possible to obtain the most excellent gyro characteristics.

Further, it was possible to confirm that excellent gyro characteristics were obtained even when the space between the width-direction center lines of the exciting drive arms 52 and 53 was increased up to twice the space between the width-direction center lines of the detection arms 55 and 56. However, it was confirmed that the gyro characteristics were rather degraded when the space difference was more than twice.

As a result of the foregoing configuration, by setting the space between the width-direction center lines of the exciting drive arms 52 and 53 to be appropriately greater than the space between the width-direction center lines of the detection arms 55 and 56, the body portion was allowed to have a large elastic stiffness, so that it was possible to obtain a high-sensitivity gyro output. On the other hand, when the space between the width-direction center lines of the exciting drive arms 52 and 53 was set smaller than the space between the width-direction center lines of the detection arms 55 and 56, the elastic stiffness of the body portion connected to the root portions of the detection arms 55 and 56 was reduced and thus it was difficult to obtain a high-sensitivity gyro output, which is thus not preferable.

OTHER EXEMPLARY EMBODIMENTS

In each of the foregoing vibratory gyroscopes, the body portion of the vibrator is constant in thickness and rectangular in shape, the non-exciting drive arm is located at the same distance from the two exciting drive arms, and the vibrator is symmetrical in shape with respect to the width-direction center line of the non-exciting drive arm. However, as long as the exciting drive arms have the same shape, the detection arms have the same shape, these arms are symmetrical in shape with respect to the width-direction center line of the vibrator, the entire vibrator is symmetrical in shape with respect to the width-direction center line, and the weight balance is achieved, the other shapes including that of the body portion are optional including the thicknesses and are not limited to the explanation described above.

Further, although the description has been given of the case where use is made of the vibrator using the X-cut langasite or the Z-cut quartz as the piezoelectric material, use may also be made of a piezoelectric single crystal including Z-cut langasite, X-cut quartz, potassium niobate, lithium tantalate, lithium niobate, or the like, or a piezoelectric polycrystal including lead titanium zirconium oxide based piezoelectric ceramic or the like.

EFFECT OF EXEMPLARY EMBODIMENTS

According to each of the foregoing vibratory gyroscopes, the front shape of the drive arms and the front shape of the detection arms can be unbalanced with each other and thus it is possible to suppress occurrence of resonance of both in the same principal plane. Further, since the detection arm width is parallel to the principal plane and greater than the drive arm width, the spurious resonance of unwanted components generated by vibrations of the exciting drive arms in the principal plane can be shifted to the outside of a use frequency band. As a result, it is possible to suppress generation of vibrations of the detection arms in the direction parallel to the principal plane in response to the vibrations of the exciting drive arms in the principal plane. Therefore, unless the drive arms are applied with Coriolis forces in the direction perpendicular to the principal plane, the detection arms do not move.

Further, since the detection arm width is parallel to the principal plane and greater than the drive arm width, it is possible to easily and efficiently detect Coriolis forces in the direction perpendicular to the principal plane. Therefore, it is possible to prevent the center of gravity of the vibrator from largely deviating from the geometric center position by achieving the weight balance with the non-exciting drive arm located at the middle portion between the drive arms. As a result, the vibrator can obtain a stable balance to vibrations by fixedly supporting the vibrator at its position including the center of gravity. Therefore, the detection arms that easily vibrate only in the direction perpendicular to the principal plane can sensitively and efficiently detect vibrations caused by Coriolis forces.

INDUSTRIAL APPLICABILITY

A vibratory gyroscope according to this invention is applicable to a gyroscope of an airplane, a spacecraft, a ship, or the like that is required to easily achieve high sensitivity and high resolution.

The invention claimed is:

1. A vibratory gyroscope comprising a vibrator which integrally comprises:
   a plate-like body portion spreading along a reference plane;
   three drive arms separately extending in a first direction from said body portion along said reference plane; and
   only two detection arms separately extending from said body portion along said reference plane in a second direction opposite to said first directions;
   wherein said three drive arms comprise:
   two exciting drive arms that are excited in mutually opposite phases in said reference plane; and
   a non-exciting drive arm that is located between said two exciting drive arms and not excited,
   each of said exciting drive arms has an arm width in a width direction which is along said reference plane and perpendicular to said first direction, and
   each of said two detection arms has a width which is greater than said arm width in said width direction.

2. The vibratory gyroscope according to claim 1, wherein said two detection arms vibrate in mutually opposite phases in a thickness direction perpendicular to said reference plane when Coriolis forces act on said vibrator.

3. The vibratory gyroscope according to claim 1, wherein said body portion is constant in thickness and rectangular in shape, said nonexciting drive arm is located at the same distance from said two exciting drive arms, and said vibrator is symmetrical in shape with respect to a center line of said non-exciting drive arm in said width direction.

4. The vibratory gyroscope according to claim 1, wherein center lines of said two detection arms in said width direction coincide with center lines of said two exciting drive arms in said width direction, respectively.

5. The vibratory gyroscope according to claim 1, wherein said two detection arms have a detection arm space defined by center lines thereof in said width direction, said two exciting drive arms have an exciting drive arm space defined by center lines thereof in said width direction, and said detection arm space is smaller than said exciting drive arm space and greater than the half of said exciting drive arm space.

6. The vibratory gyroscope according to claim 1, further comprising a support post for supporting said vibrator, wherein said three drive arms and said two detection arms have sizes to match a position of the center of gravity of said vibrator with a geometric center position of said body portion, and said support post supports a portion of said vibrator corresponding to said position of the center of gravity.

7. The vibratory gyroscope according to claim 1, wherein said vibrator is made of a piezoelectric material.

8. The vibratory gyroscope according to claim 7, wherein said piezoelectric material is a piezoelectric single crystal including at least one of quartz, langasite, potassium niobate, lithium tantalate, and lithium niobate.

9. The vibratory gyroscope according to claim 7, wherein said piezoelectric material is a piezoelectric polycrystal including lead titanium zirconium oxide.

* * * * *

UNITED STATES PATENT AND TRADEMARK OFFICE
CERTIFICATE OF CORRECTION

PATENT NO. : 7,528,533 B2
APPLICATION NO. : 11/795188
DATED : May 5, 2009
INVENTOR(S) : Ochi et al.

It is certified that error appears in the above-identified patent and that said Letters Patent is hereby corrected as shown below:

In particular, in Column 9, line 38, Line 9 of Claim 1 after the word "first" please change "directions" to correctly read:   --direction--.

Signed and Sealed this

Thirtieth Day of June, 2009

JOHN DOLL
*Acting Director of the United States Patent and Trademark Office*